United States Patent
Co et al.

(10) Patent No.: US 8,626,640 B2
(45) Date of Patent: *Jan. 7, 2014

(54) SYSTEM AND METHOD FOR IMPLEMENTING AND MANAGING BUNDLED OPTION BOX FUTURES

(71) Applicant: Chicago Mercantile Exchange Inc., Chicago, IL (US)

(72) Inventors: Richard Co, Chicago, IL (US); Tuen Tuen Wang, Chicago, IL (US); Xing Su, Chicago, IL (US); John Labuszewski, Westmont, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/759,605

(22) Filed: Feb. 5, 2013

(65) Prior Publication Data

US 2013/0211996 A1 Aug. 15, 2013

Related U.S. Application Data

(63) Continuation of application No. 12/911,516, filed on Oct. 25, 2010, now Pat. No. 8,374,953.

(51) Int. Cl.
*G06Q 40/00* (2012.01)
(52) U.S. Cl.
USPC .......................................................... 705/37
(58) Field of Classification Search
USPC .......................................................... 705/37
See application file for complete search history.

(56) References Cited

U.S. PATENT DOCUMENTS

| | | | |
|---|---|---|---|
| 5,819,230 A | 10/1998 | Christie et al. | |
| 7,567,928 B1 | 7/2009 | Oaten et al. | |
| 7,937,302 B1 | 5/2011 | Lego et al. | |
| 8,073,761 B2 | 12/2011 | Bjornson et al. | |
| 2001/0037284 A1 | 11/2001 | Finkelstein et al. | |
| 2004/0103127 A1 | 5/2004 | Bjornson et al. | |
| 2006/0155638 A1 | 7/2006 | de la Motte | |
| 2007/0250439 A1 | 10/2007 | Crocker | |
| 2007/0294159 A1* | 12/2007 | Cottle | 705/37 |
| 2008/0120213 A1 | 5/2008 | Morik | |
| 2008/0243576 A1 | 10/2008 | Czupek et al. | |
| 2010/0169205 A1 | 7/2010 | Labuszewski et al. | |
| 2010/0191643 A1* | 7/2010 | Brady et al. | 705/37 |
| 2011/0112989 A1* | 5/2011 | Devito | 705/500 |

OTHER PUBLICATIONS

International Search Report for PCT Application No. PCT/US09/60865 mailed Dec. 1, 2009 (9 pp.).
International Search Report and Written Opinion for PCT Application No. PCT/US11/55238 dated Dec. 28, 2011 (7 pp.).

(Continued)

*Primary Examiner* — Clifford Madamba
(74) *Attorney, Agent, or Firm* — Brinks Hofer Gilson & Lione

(57) ABSTRACT

A system and method of providing a collateralized loan utilizing a clearing counterparty is disclosed. The system includes a match engine module to receive an order for a bundled box spread future representative of the collateralized loan via an options box spread. The order specifies an interest rate associated with the collateralized loan as the price of the futures contract. A trade database identifies a bundled box spread future associated with the received order and interest rate and an order book module identifies a standing order that is compatible with the received order. A clearing module credits an account with a loan amount based on the identified bundled option box future. A risk management module credits a margin amount to reflect the collateralized loan and associated collateral assets.

5 Claims, 7 Drawing Sheets

(56) References Cited

OTHER PUBLICATIONS

Co, Richard, "Box Spreads of Equity Index Options on Futures as a Financing Tool," Research and Product Development, Aug. 2008 (4 pp.).

Repurchase Agreement, *Wikipedia, the Free Encyclopedia*, last modified on Nov. 26, 2008 (5 pp.).

"The Lending Process of BNY Mellon Asset Servicing," website, www.mellon.com/securitieslending/lendingprocess.html (2 pp.).

* cited by examiner

Effective Face Value of Loan

| Strike Interval | Face Value | Strike Interval | Face Value |
|---|---|---|---|
| 5 | $1,250 | 50 | $12,500 |
| 10 | $2,500 | 100 | $25,000 |
| 15 | $3,750 | 200 | $50,000 |
| 20 | $5,000 | 500 | $125,000 |
| 25 | $6,250 | 1,000 | $250,000 |
| 30 | $7,500 | 2,000 | $500,000 |

FIG 4

Implicit Minimum Tick (In Basis Points)

| Strike Interval | Days | | | | |
|---|---|---|---|---|---|
| | 10 | 30 | 60 | 90 | 180 |
| 20 | 1,800 | 600 | 300 | 200 | 100 |
| 25 | 1,440 | 480 | 240 | 160 | 80 |
| 30 | 1,200 | 400 | 200 | 133 | 67 |
| 50 | 720 | 240 | 120 | 80 | 40 |
| 100 | 360 | 120 | 60 | 40 | 20 |
| 200 | 180 | 60 | 30 | 20 | 10 |
| 1,000 | 36 | 12 | 6 | 4 | 2 |
| 2,000 | 18 | 6 | 3 | 2 | 1 |

FIG 5

Hypothetical Delivery Unit

| Long/Short | Qty | Strike | Expiry | Type |
|---|---|---|---|---|
| Long (Short) | 2 | 50 | Dec 10 | Call |
| Short (Long) | 2 | 50 | Dec 10 | Put |
| Short (Long) | 2 | 2,050 | Dec 10 | Call |
| Long (Short) | 2 | 2,050 | Dec 10 | Put |

FIG 6

SYSTEM AND METHOD FOR IMPLEMENTING AND MANAGING BUNDLED OPTION BOX FUTURES

CROSS-REFERENCE TO RELATED APPLICATION

This application is a continuation of, and claims the benefit of priority to, U.S. Pat. No. 8,374,953 (U.S. patent application Ser. No. 12/911,516, filed Oct. 25, 2010), issued Feb. 12, 2013, the entirety of which is incorporated by reference herein.

BACKGROUND

A box spread is a known tool in option trading. A box spread is a combination of four distinct option positions having a common expiration date. This combination of four option positions will dictate that, at the expiration, the seller of the box spread shall return a fixed sum of money to the buyer of the box spread, regardless of what the price of the underlying asset is at that point in time. The initial price of the box is thus the net present value, at the time of the box spread trade, of the fixed sum to be repaid by the seller to the buyer of the box spread at the expiration. Typically, the initial price of the box spread is below that of the sum to be prepaid on the expiration date, tantamount to applying a positive interest rate for the determination of the net present value.

Further, with an option box spread traded based on options listed at an exchange, the positions are novated to the clearing house associated with the exchange. The trade is guaranteed by the clearing house by the process of novation, i.e. substitution of the clearing house as the counterparty of the trade for both the buyer and the seller. As such, the buyer and seller of the options box spread will no longer be exposed to the credit risk of the original counterparty. The clearing house, in turn, manages risk by requiring the market participants to transfer sufficient collateral to guarantee the performance of each counterparty. In the case of an option box spread trade, the buyer posts cash dictated by the price of the box spread, while the seller of the box spread posts sufficient collateral, typically securities with a liquid market, to guarantee the repayment amount at the expiration of the options. As such, the arrangement is tantamount to a loan from the buyer of the box spread to the seller of the box spread, with the exchange clearing house standing in the middle to serve as a custodian and manager of the collateral posted by the seller of the box spread.

Given that the option box spread is equivalent to a collateralized borrowing/lending transaction, the most relevant basis for trade negotiation would be the interest rate for the loan. With the interest rate embedded in the discounted value, the fluctuation of the interest rate becomes obscured by the passage of time, for example. It would be desirable to provide a system and method to facilitate listing, quoting and trading box spreads in the most appropriate quoting convention, as well as to provide a facility to trade the box spread on a forward basis.

BRIEF DESCRIPTION OF THE DRAWINGS

Examples of the invention are described with reference to the accompanying drawings, in which components, features and integral parts that correspond to one another each have the same reference number, wherein:

FIG. 4 illustrates effective face values of loans to bundled box option spreads based on options on standard S&P 500 index futures;

FIG. 5 illustrates implicit minimum ticks associated with an exemplary bundled box option spread based on options on standard S&P 500 index futures;

FIG. 6 illustrates an exemplary bundled box option spread deliverable for the box spread futures.

DETAILED DESCRIPTION

Bundled option box futures or bundled box futures provide an advantageous way of listing, quoting and trading box spreads that facilitate use of boxes in the context of borrowing and lending activities.

Figure 1:
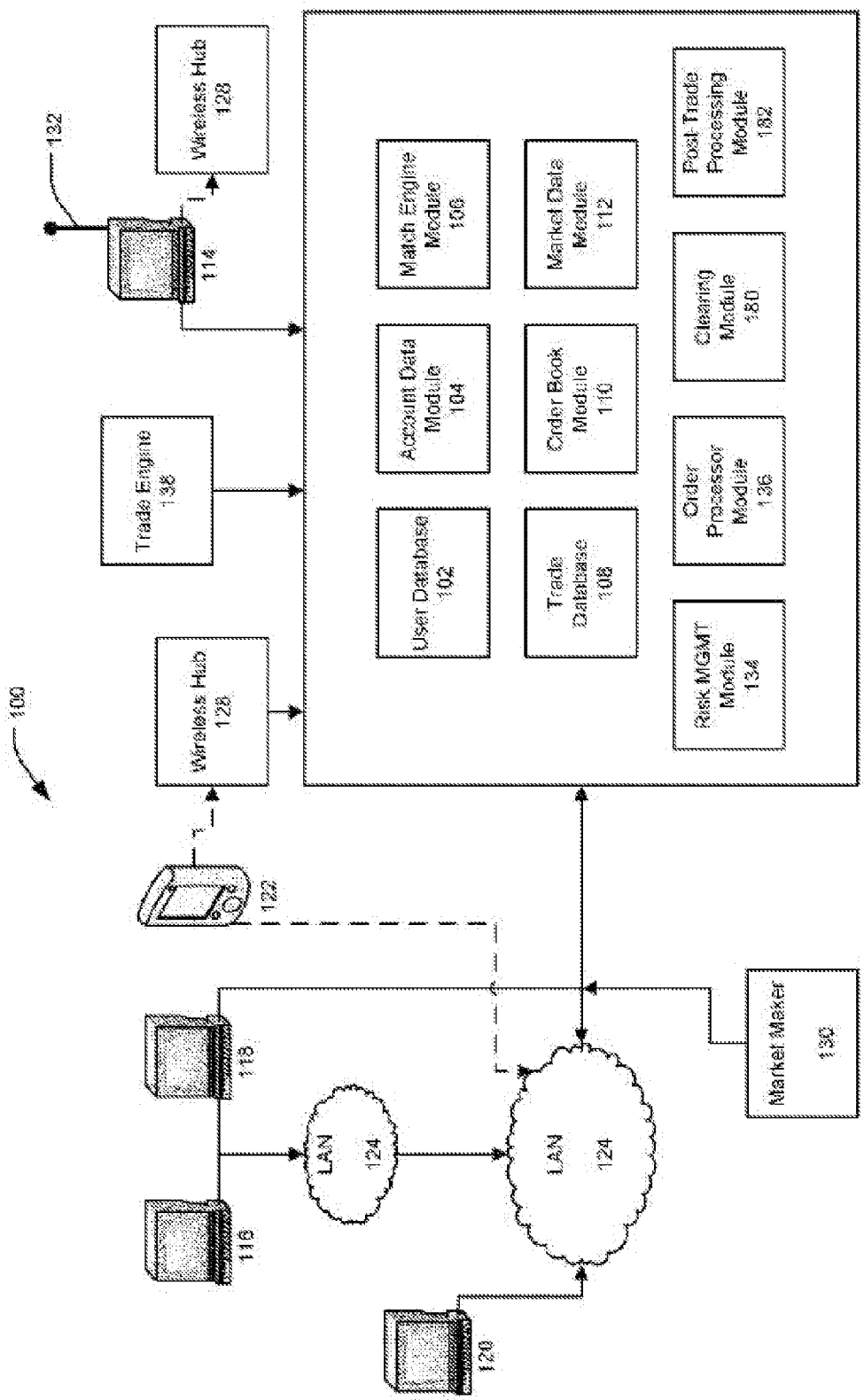
FIG. 1 illustrates an exemplary system for implementing a bundled option spread in accordance with the disclosure presented herein.

FIG. 1 illustrates an exemplary exchange computer system 100 or trading network configured to allow users to exchange trading information related to bundled box futures. The exemplary exchange computer system or trading network 100 may be configured to receive orders and transmit market data related to orders, trades and related information. Exchange computer system 100 may be implemented with one or more mainframes, servers, gateways, controllers, desktops or other computers.

The exchange computer system or trading network 100 may include a user database 102 configured to store and index information identifying traders, investors and other users of the system. The user database 102 may further store and index user names, passwords associated with user accounts stored in an account data module 104. The account data module 104 may process account information utilized during trades, clearing and/or margining operations.

The exchange computer system or trading network 100 may further include a match engine module 106, a trade database 108, an order book module 110, and a market data module 112. Match engine module 106 may be configured to match bid and offer prices. Match engine module 106 may be implemented with software that executes one or more algorithms for matching bids and offers. Match engine module 106 may be configured to execute operations, algorithm and programs to implement and process trades for the clearinghouse. Trade database 108 may store information identifying trades and descriptions of trades. In particular, trade database 108 may store information identifying or associated with the time that a trade took place and the contract price. The order book module 110 may be configured to compute or otherwise determine current bid and offer prices. A market data module 112 may be included to collect market data and prepare the data for transmission to users. A risk management module 134 may be included to compute and determine a user's risk utilization in relation to the user's defined risk thresholds.

The exchange computer system or trading network 100 may further include an order-processing module 136, a clearing module 180 and/or a post-trading module 182. The order-processing module 136 may be configured to decompose delta-based and bulk order types for processing by order book module 110 and match engine module 106. The clearing module 180 may be configured to clear outstanding positions on a contract settlement day or any other trading day. The post-trade processing module 182 may further be configured to generate reports and enumerate details of the trades that may fulfill delivery obligations.

FIG. 1 further illustrates computers, terminal and other devices 114, 116, 118, 120 and 122. The computers, terminal and other devices 114, 116, 118, 120 and 122 may include one or more central processors, or controllers, coupled to one or more system buses that connect the central processor to one or more communication components, such as a network card or modem. The computers, terminal and other devices 114, 116, 118, 120 and 122 may further include interface units, drives, memory and storage modules for reading, writing storing data and computer executable instructions. Depending on the type of computer device, a user can interact with the computer with a keyboard, pointing device, microphone, pen device or other input device.

Computer device 114, in this exemplary embodiment, is in communication with the exchange computer system 100 via, for example, a T1 line, a wide area network (WAN), a local area network (LAN), a wireless local area network (WLAN) compliant with IEEE 802.11x or other communication standards capable of communicating or transporting the financial information utilized by the exchange computer system or trading network 100. Computer device 114 may further be in communication with a trader or exchange employee via a radio 132. The radio user may transmit orders or other information to a user of computer device 114 that, in turn, may then transmit the trade or other information to exchange computer system 100. As shown in FIG. 1, wireless communications and/or wireless communication channels are illustrated as dashed lines coupling two or more illustrated elements.

Computer devices 116 and 118 communicatively couple to the exchange computer system 100 via a local area network (LAN) 124. LAN 124 may have one or more of the known LAN topologies and may use a variety of different protocols, such as Ethernet, IEEE 802.11 (Wi-Fi), IEEE 802.16 (WiMAX). Wireless personal digital assistant device (PDA) 122 may communicate with LAN 124 or the Internet 126 via, for example, Wi-Fi and/or WiMAX communication protocols. PDA 122 may further communicate with exchange computer system 100 via wireless hub 128. PDA is defined broadly to include mobile telephones such as smart phones and other wireless devices, netbooks, tablet computers or other devices capable of communicating with the LAN 124 or wireless hub 128.

FIG. 1 further illustrates LAN 124 coupled to the Internet 126. Communication within the LAN 124 and between the Internet 126 may be facilitated by routers, domain name servers, gateways, virtual private network (VPN) servers, storage devices and other known networking equipment.

One or more market makers 130 may maintain a market by providing substantially constant bid and offer prices for a financial instrument, such as a derivative or security, to exchange computer system 100.

Exchange computer system 100 may also exchange information with other exchanges, markets represented by trade engine 138. Additional computers and systems such as, for example, clearing, regulatory and fee systems, may be coupled to exchange computer system 100 in the manner described above.

The operations of computer devices and systems shown in FIG. 1 may be controlled or directed by computer-executable instructions stored on computer-readable medium and executed by one or more processors. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Additional servers, computers, handheld devices, personal digital assistants, telephones and other devices may also be connected to exchange computer system 100. Moreover, the topology shown in FIG. 1 is merely an example and that the components shown and described in connection with the exemplary topography may be reconfigured and rearranged into different topologies and configurations.

Figure 2:
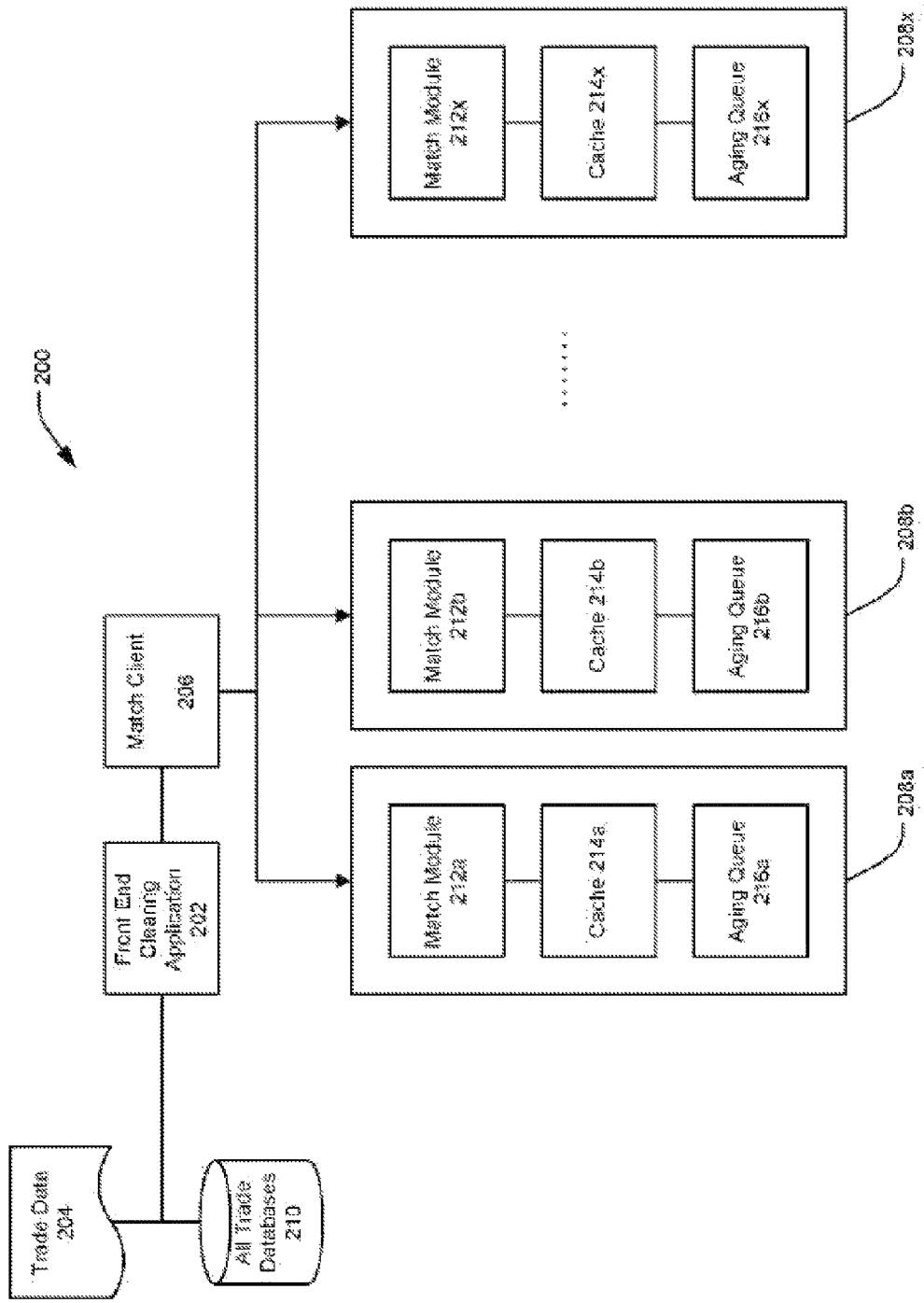
FIG. 2 illustrates an exemplary match system which may be implemented in connection with the system shown in FIG. 1.

FIG. 2 illustrates an exemplary match system 200 that may be implemented to list, record, track and match orders and/or trades for bundled option box futures and the futures to which they relate. The match system 200 includes a front end clearing application 202 configured to receive trade data 204. Trade data 204 may include information that identifies an order for a futures contract such as the bundled option spreads contract discussed and disclosed herein. For example, the match system 200 may utilize trade data 204 representative of, for example, a standard S&P 500 futures contract which are listed on each trading day of the year by CME. Each contract is available from 8:30 am to 3:15 pm (CT) and may be traded on an electronic trading system such as the Globex® electronic trading system.

The match system 200, in this exemplary embodiment, operates as a central counterparty to each party of the contract. The central counterparty clears and ensures each trade handed by the match system 200. The action of the central counterparty provides and/or ensures capital efficiencies and minimizes risk for traders of the exchange traded derivative contacts.

A match client 206 may contain application program interfaces and/or other software modules that allow front end clearing application 202 to communicate with a plurality of match servers 208a and 208b. A variety of different match clients may be used to allow different front end clearing applications to communicate with match servers. For example, a first front end clearing application may use a first match client to communicate with a set of match servers and a second front end clearing application may use a second match client to communicate with the same set of match servers. Front end clearing application 202 is also coupled to an all trades database 210. All trades database 210 contains a master record of all trades that have taken place.

FIG. 2 further illustrates a pair of match servers 208a and 208b. Each of the match servers 208a and 208b may be in the same location or may be geographically distributed. As previously discussed, a pair of servers 208a and 208b are shown in this exemplary embodiment, but this configuration may be scalable to include both fewer and multiple additional services. Match servers 208a and 208b may each be connected to one another, connected through a common hub or connected in another manner that allows each match server to communicate with the remaining match servers. Servers 208a and 208b contain modules for matching orders, such as futures orders executed at an exchange. Server 208a includes a match module 212a that may be implemented with a software application that matches unmatched trades. Match module 212a may include or be linked to a set of rules for matching orders. The rules for matching orders may identify specific match criteria used for matching specific orders. As described in detail below, a match module may use several different match criteria and the match criteria selected may be a function of the length of time that order data has remained unmatched.

Server 208b, in one exemplary embodiment, may include match modules 212b that may be similar to match module 212a. The match modules 212a and 212b may be used to match specific types of orders or trades that take place in specific locations. For example, match module 212a may be configured to match orders that were executed at one exchange and match module 212b may be used to match orders that were executed at another exchange.

Servers 208a and 208b may receive and store trade data from front end clearing application 202 in caches 214a and 214b, respectively. In one embodiment, each cache 214a and 214b contains all trade data, while in other embodiments the trade data may be distributed or parceled among multiple caches in one or more servers.

The match modules 212a and 212b and/or caches 214a and 214b may communicate using the Java Messaging Service standard publish and subscribe application program interface (API). The type of information that may be exchanged includes information to add, update and remove trade and/or order data from caches 214a and 214b. Information may be communicated in a variety of formats, for example, information may be exchanged identifying changed information, providing a complete copy of the cached information, partial updates of segments based on time or activity or any other desired communication schedule or schema.

Servers 208a and 208b may further include aging queues 216a and 216b. Each aging queue or book may contain trade data representative of orders that have not been matched. Each book may contain a unique subset of unmatched trade data so that the workload is distributed across servers. In this way, different futures related to individual stock indexes may be handled by different books and aging queues deployed in one or more servers 208a, 208b to 208x.

Figure 3:
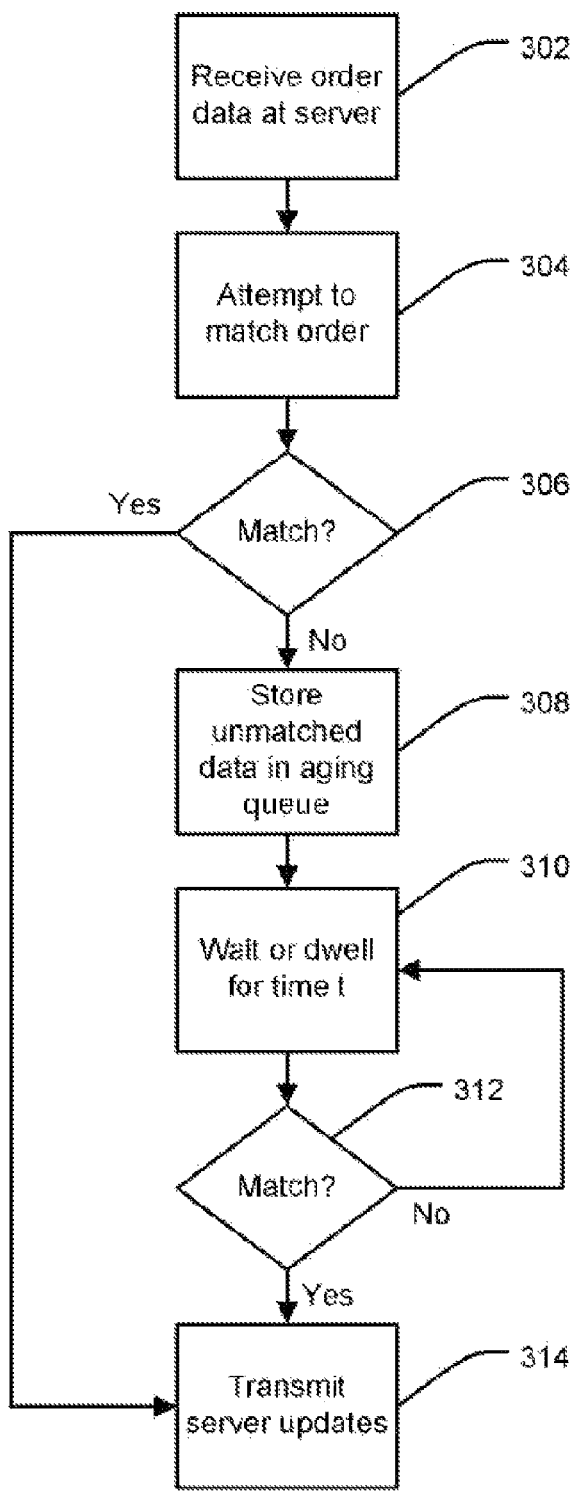
FIG. 3 illustrates an exemplary ordering method for bundled box option spreads which may be implemented in connection with the system shown in FIG. 1.

FIG. 3 illustrates an exemplary method 300 of matching orders in accordance with an embodiment disclosed herein. At block 302 of the method, order data is received at a match server identifying a particular class, price and quantity for a bundled option box futures. The method, as shown in block 304 may utilize one or more of the match modules 212 and the match client 206 in an attempt to match the received order data with other existing orders in the cache 214 and/or aging queue or book 216. The method bifurcates at block 306 based on whether or not the received order dated is matched by the match module 212 and/or the match client 206. If the match is made, the method skips ahead to block 314. Conversely, if the match is not made, the method continues to handle and process the received order data as discussed in blocks 308 to 312. In particular, the method at block 308 stores the unmatched order data in one or more of the aging queues or books 216. The order data, as shown in block 310, stored the unmatched order data for a predetermined period.

The method bifurcates again as shown at block 312 based on a determination of whether or not the order data stored within the aging queue or book 216 has been matched after the predetermined period of time shown in block 310. If the match is again not made, the method returned to block 310 to rest for a predetermined period. However, if the order data is matched, the method continues to the element or step discussed in connection with the block 314. After the order data is determined to be match at either block 306 and the block 312, the method discloses that the match data and match server state change information or other update information may be transmitted to the match servers 208.

I. Box Spread Mechanics

As previously discussed, a box spread entails the simultaneous purchase and sale of four options with the same expiration. There are typically two strike prices involved. The higher of the two strike prices may be identified as the high strike, and remaining strike price may be identified as the low strike. The buyer of the options box spread may, for example, buy a call with the low strike, sell a put at the low strike, sell a call with the high strike and buy a put at the high strike. For example, standard Mar-09 S&P 500 futures may have settled at 1,061.70 on Feb. 4, 2010. There were 133 days until the Jun. 17, 2010 expiration of the Mar-09 S&P 500 options. At the time, a trader may have bought an exemplary box spread by buying the 1,050 Mar-09 call, selling the 1,050 Mar-09 put, selling the 1,080 Mar-09 call and buying the 1,080 Mar-09 put. Table 1 illustrates this exemplary box spread as:

TABLE 1

| Buy 1,050 June 2009 Call @ | 63.50 pt = | ($15,875) |
| Sell 1,050 June 2009 Put @ | 56.60 pt = | $14,150 |
| Sell 1,080 June 2009 Call @ | 47.00 pt = | $11,750 |
| Buy 1,080 June 2009 Put @ | 70.00 pt = | ($17,500) |
| Initial Net Debt | | ($7,475) |

The exemplary box spread illustrated in Table 1 may have been purchased for an initial net debit of $7,475 ($250.times.29.90). But at expiration, the box spread will be valued at the difference in strike prices or $7,500 ($250.times.30 index points) in any circumstance.

Return on Box=Difference in Strikes−Initial Net Payment

If, in one scenario, the market trades to the lower of the two strike prices by the common expiration date, the 1,050 struck options are at-the-money and worthless. The 1,080 call falls out-of-the-money and similarly expires worthless. The holder or owner of the box spread may, in turn, exercise the 1,080 put and recover the intrinsic value of $7,500 less the initial net debit of $7,475 for a profit of $25.

If, in another scenario, the market trades to the upper strike price by the common expiration date, the 1,080 options are at-the-money and worthless. The 1,050 put falls out-of-the-money and similarly expires worthless. The 1,050 call may be exercised to recover the intrinsic value of $7,500. The box generates a profit of $7,500 less the initial net debit of $7,475, for a profit of $25.

Thus, the buyer of the box spread shown in Table 1 will always generate $25 in profit while the seller of the box will always generate a $25 loss. The initial net debit of $7,475 for the buyer of the box spread represents a credit of $7,475 for the seller of the box and may be considered a loan secured by the CME Group Clearing House via the financial safeguards offered therethrough. Translated into borrowing/lending terms, the interest on the original $7,475 loan amount is $25. Alternatively, the eventual repayment of $7,500 was discounted to $7,475 at the time of the box spread trade, with $25 difference being the discount interest.

A. Calculating the Loan Rate

In the embodiment shown in Table 1, the difference between the payment or loan of $7,475 at the initiation of the box spread and the receipt of $7,500 on the common expiration date implies a return of $25. In order to determine the effective interest rate associated with the return, the following formula may be applied:

Implicit Rate=(360/days)×(Return on Box/Diff in Strikes)=(360/133)×($25/$7,500)=0.902%

In this embodiment, the $25 return represents interest accrued while the face value of the loan may be represented as the difference in strike prices or $7,500. The loan term is 133 days. Based on these known values, the effective interest rate may be calculated as 0.902%. The box spreads may, in turn, be priced to reflect the discounted present value of the difference in strike prices.

B. Discount Loan Structure

Returning to the example shown in Table 1, the interval between strike prices of the options that comprised the box spread is 30 index points (1080−1050=30). The known contract multiplier for standard S&P 500 options is $250.times. which, in turn, implies that $7,500 ($250.times.30 index points) may be from box seller to buyer at the common expiration date. The effective loan principal is, in this exemplary embodiment, equal to the combined difference in strike prices. FIG. 4 illustrates loans that may be transacted by utilizing options at different strike prices.

Box spreads constructed in this manner provide for a loan structure similar to a Treasury bill in that both are "discount" instruments that are purchased at a value less than the stated face value. Upon maturity, bills call for the return of the stated face value. For example, a Treasury bill may be purchases for $995,000 and redeemed for a $1 million after a 90-day period. Utilizing the implicit rate formula provided above, the rate on this transaction may be calculated as 2%. The effective rate on an exemplary box spread represents a "discount yield" (DY) similar to a quoted T-bill rate. The yield on a discount instrument such as a Treasury bill or a box spread may not be directly comparable to the quoted yield associated with an "add-on" instrument such as Eurodollars which are quoted as a "money market yield" (MMY). The discount yield may be reconciled with a money market yield per the following formula.

MMY=DY×(Diff in Strikes/Diff in Strikers−Return on Box)=0.902%×($7,500/$7,500−$25)=0.905%

Thus, the discount yield of 0.902% associated with the exemplary box spread discussed above may equate to a money market yield of 0.905%

C. Quote Convention

Box spreads may be quoted in terms of option ticks noting that the minimum tick size in standard S&P 500 options is equal to 0.10 index points or $25 ($250.times.0.10 index points). However, quoting box spreads in terms of ticks is often difficult and/or confusing when the transaction is the basis for a collateralized loan. Loans are typically quoted in terms an interest rate. Further, the typical tick size of extant option contracts is so large that the minimum amount by which the implicit interest rate may be adjusted may be extremely large. Loan instruments, by way of comparison, are typically quoted in terms of an interest rate, often in minimum increments of perhaps 0.01% (one basis point) or 0.005% (one-half basis point) or even 0.0025% (one-quarter basis point).

For example, returning to the box spread discussed above, assume that the value of the illustrated box spread changed by one minimum price fluctuation of $25. The return on the box spread increases from $25 to $50 and the initial net payment decreases from $7,475 to $7,450. The implicit interest rate on the exemplary box spread, as shown below, may be calculated to equal 1.804%.

Implicit Rate=(360/133)×($50/$7,500)=1.804%

Stated another way, the implicit rate increases from 0.902% to 1.804% (a change of +0.902%) given a one-tick fluctuation in the value of the box. For example, the implicit tick size of the box spread quoted in an interest rate equals 90.2 basis points. The implicit minimum tick size of the loan is a function of the strike price interval (which further defines the face value of the loan) and the days until loan maturity. A generalized formula for the implicit minimum tick may be expressed as:

Implicit Trick=(360/days)×(Tick Value/Diff in Strikes)=(360/60)×($25/$25,000)=60 basis points FIG. 5 illustrates that the implicit minimum tick, quoted in basis points on an annualized basis, of the exemplary box spread with strikes that are 100 index points apart (a $25,000 loan=$250.times.100) with 60 days until term equals 60 basis points. The implicit minimum tick of a box with strikes that are 2,000 index points apart (a $500,000 loan=$250.times.100) with 180 days until term equals 1 basis point. Typically, the implicit minimum ticks associated with box spreads are too imprecise to provide for a competitive and precise lending situation. Moreover, in normal lending situations, the loan is quoted in successively finer increments as the term declines while the implicit tick associated with boxes increases as the loan term declines.

II. Bundled Option Box Futures

In order to address the shortcomings of known box spreads, bundled option box spreads have been developed. A bundled option box spread is a futures contract, hereafter referred to as box spread futures, that calls for the delivery of options on futures. In an exemplary bundled option box future, strike prices may be fixed at a 2,000 index point interval with a specific option expiration from the expiration of the box spread futures, e.g., 30-days, 60-days, 90-days. In order to provide for a $1,000,000 face value loan, bundled option box spread futures may call for the delivery of two (2) option box spreads, assuming that the standard S&P 500 index futures have multiplier of $250 per index point. The contract may be quoted in yields in minimum tick sizes of ¼th of one basis point (0.0025%) to facilitate the use of option boxes as loan instruments with a suitably calibrated tick size.

In an exemplary embodiment shown in FIG. 6, the exchange may list a box spread futures contract that calls for the delivery of eight options. This exemplary futures contract may settle on Nov. 17, 2010 so that there is 30 days until the Dec. 17, 2010 expiration of the eight (8) European-style flex options that are delivered. Buying the exemplary bundled box futures contract, results in the purchase of two (2) long Dec-10 calls struck at 50; two (2) short Dec-10 calls at 50; two (2) short Dec-10 calls at 2,050; and, two (2) long Dec-10 calls at 2,050. This implies a net debit of nearly $1 million. Thus, buying the bundled box represents a loan of cash. Conversely, selling the exemplary bundled box futures contract, results in the sale of the opposite positions. This implies a credit of $1 million. Thus, selling the bundled box represents borrowed cash.

A. Quoting Bundled Box Futures

An exemplary bundled futures contract is quoted using the IMM Index convention, i.e., at 100 less an interest rate. The minimum increment or tick size shall be ¼ of one basis point (0.0025%). Based upon a $1 million face value 30-day loan, the tick equates to a value of $2.0833. Similarly, the tick value of a 60-day bundled box futures contract equals $4.166 while a 90-day bundled box contract has a tick value of $6.25. For purposes of a daily mark-to-market, the tick is rounded to the nearest penny.

Tick Value=0.0025%(Days/360)×Diff in Strikes=0.0025%(39/360)×$1,000,000=$2,0833

Assume that the contract is quoted at a value of 99.1225. This implies a discount yield (DY) of 0.8775% or 87.75 basis points (=100−99.1225). Thus, the initial net debit (credit)

upon purchase (sale) of the bundled box spread equals $999,268.75. The interest associated with the loan equals $731.25 ($1,000,000−$999,268.75).

$$\text{Debit(Credit=Diff in Strikes}[D/\!\times\!(\text{Days}/360)\!\times\!\text{Diff in Strikes}]\!=\!\$1{,}000{,}00\!-\![03.8775\%\!\times\!(30/360)\!\times\!\$1{,}000{,}000]\!=\!\$999{,}268.75$$

B. Settlement and Management of Bundled Box Futures

Figure 7:
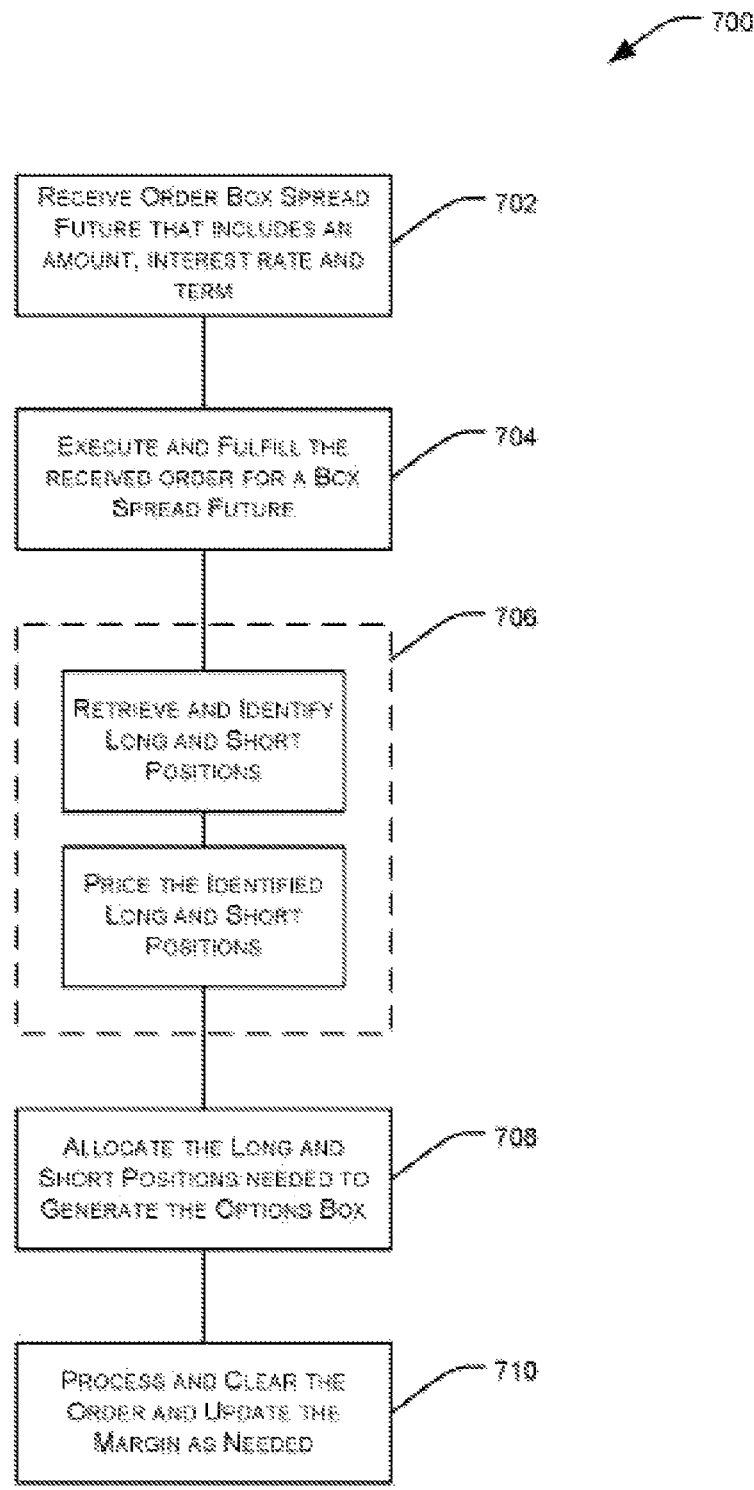
FIG. 7 illustrates an exemplary order process by which an order for an exemplary box spread future may be executed.

As previously discussed, a box spread future may be defined such that difference in strike prices may be fixed, an interest rate or cost of the loan is known and a specific option expiration from the expiration of the box spread futures, e.g., 30-days, 60-days, 90-days, is defined. FIG. 7 illustrates an exemplary order process 700 by which an order and delivery process for an exemplary bundled box spread future may be processed by, for example, the trade database 108, the match engine module 106 and/or the order book module 110.

At step 702, an order for a bundled box spread future may be received and matched to a complimentary order resting in the order book module 110 and/or received by the match engine module 106.

At step 704, the order book module 110 and/or the match engine module 106 may execute the order for the box spread future based on the received terms.

At step 706, following the expiration of the bundled box spread futures, the clearinghouse may utilize the order book module 110 and one or more algorithms implemented by the match engine 106 may be identified and retrieved by the long and short open interests. The final settlement price of the futures contract will imply an interest rate for the period or term of the box spread. The interest rate may be expressed, for example, using the IMM Index convention described above.

The match engine module 106 may cooperate with, for example, the trade database 108, order book module 110 and market data module 112 to specify (a) the four options that form the options box spread; (b) the price of the four options based on the input from trade database 108, order book module 110, and market data module 112, along with a pricing algorithm or module configured to use the current market quotes from the futures and options of the underlying index futures market input to determine the individual price of the options in the options box spread to be delivered; and amend one or more of the four option prices to ensure that the resultant four options prices would imply an interest rate identical to that implied by the final settlement price of the box spread futures. For example, three of the four option prices may be determined using known option pricing formulas and the fourth may be determined as a function of the net present value of the box spread based on the box spread futures final settlement price. The net present value, in this example, is the net present value of the strike differential of the box spread based on the final settlement price of the box spread futures. Table 2 provides an example of legs that may be identified and selected to form the options box spread associated with the now-expired bundled box spread future.

TABLE 2

| Four Legs of an Exemplary Box spread example | |
|---|---|
| 1 | Buy 1,050 June 2009 Call @ |
| 2 | Sell 1,050 June 2009 Put @ |
| 3 | Sell 1,080 June 2009 Call @ |
| 4 | Buy 1,080 June 2009 Put @) |

At step 708, the trade database 108, order book module 110 and market data module 112 may cooperate with the match engine module 106 to allocate a long position to each short position in the expired bundled box spread futures as buyer and seller of the options box spread, and enter the purchase and sale of the box spread between the buyer and the seller of the box spread paired up by the module, at the options prices determined in step 704. These options position will be commingled with other positions in the buyer's or seller's respective options (and futures) positions that are residing in, for example, the order book module 110.

At step 710, once the long and short positions have been allocated, the account data module 104 issues instructions to other modules such as, for example, the order processor module 136 and the clearing module 180, in the exchange computer system 100 that calls for the collection of the options premium from the buyer of the box spread, and the release of the options premium to the seller of the box spread, due to step 708. The positions will be relayed to risk management module 134 of the clearinghouse to determine the incremental impact for performance bond requirement. For example, the sale of the box spread may increase the margin requirement for the seller of the box spread. With the posting of non-cash collateral, the option premium released in step 710 may be allowed to be withdrawn by the seller.

C. Other Operational Considerations

Prior to the expiration of the box spread futures, the futures positions are subject to marked-to-market daily and subject to normal initial, maintenance and variation margin requirements in a normal futures market. Upon expiration of the box spread futures, the buyer of the box spread futures shall pay in cash the option premium implied by the final settlement price of the box spread futures. In exchange, the buyer of the box spread futures shall receive the corresponding options positions in his/her account. Conversely, the seller of the box spread futures shall receive in cash the option premium implied by the final settlement price of the box spread futures. In return, the seller of the box spread futures will also receive the corresponding options positions in his/her account. In effect, the buyer and the seller of the box spread futures execute an options box spread trade at the expiration of the box spread futures based on the final settlement price of the box spread futures. The resulting option box spread position will then be subject to the normal collateralization requirement imposed by the clearing house. Bundled box futures enjoy all the benefits inferred by a multi-lateral clearing system which includes a daily mark-to-market process administered through standard futures accounting systems and held in segregated futures accounts. This further includes all the protections of the CME Clearing House financial safeguards package. Once the option box (a functional loan instrument) is delivered, it continues to be carried by the CME Clearing House in segregated accounts, likewise enjoying all the benefits and financial sureties implied thereby. These sureties are particularly important in the wake of the so-called subprime mortgage crisis where counterparty credit risks have arisen as a significant issue. Further note that the functional loan is carried within CME clearing systems where the funds may be used to meet the financial obligations associated with carrying positions in other CME Group products on an automated basis. Bundled box futures may additionally be quoted in terms of a rate in minimum increments or ticks that are compatible with typical loan instruments, as well as being traded on a forward basis, i.e. in advance of the actual collateralized lending/borrowing.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A system for providing a collateralized loan via a clearing house, the system comprising:
   a match engine module configured to receive an order for a bundled box spread future representative of the collateralized loan via an options box spread, wherein the order specifies an interest rate associated with the collateralized loan as the price of the futures contract;
   a trade database in communication with the match engine module and configured to identify a bundled box spread future associated with the received order and the interest rate;
   an order book module in communication with the trade database and the match engine module, wherein the order book module is configured to identify a standing order that is compatible with the received order;
   a clearing module configured to credit an account with a loan amount based on the identified bundled option box future; and
   a risk management module configured to credit a margin amount to reflect the collateralized loan and associated collateral assets;
   wherein the match engine module is further configured to automatically define a first pair of options at a first strike price and a second pair of options at a second strike price, further wherein the interest rate is a function of the term and the ratio of a box return to a difference between the first and second strike prices.

2. The system of claim 1, wherein the first and second pair of options define the options box spread.

3. The system of claim 1, wherein the interest rate represents a price of the futures contract.

4. The system of claim 1 further comprising:
   a post trade processing module configured to generate a trading report.

5. The system of claim 1 wherein the risk management module is configured to determine an incremental impact for performance bond requirement.

* * * * *